US009917444B2

(12) United States Patent
Modeer et al.

(10) Patent No.: US 9,917,444 B2
(45) Date of Patent: Mar. 13, 2018

(54) METHOD FOR DC-AC CONVERSION

(71) Applicant: OPTISTRING TECHNOLOGIES AB, Stockholm (SE)

(72) Inventors: Tomas Modeer, Stockholm (SE); Anders Lindgren, Stockholm (SE); Gustav Bergquist, Stockholm (SE)

(73) Assignee: ABB SCHWEIZ AG, Baden (CH)

( * ) Notice: Subject to any disclaimer, the term of this patent is extended or adjusted under 35 U.S.C. 154(b) by 198 days.

(21) Appl. No.: 14/770,555

(22) PCT Filed: Feb. 24, 2014

(86) PCT No.: PCT/EP2014/053555
§ 371 (c)(1),
(2) Date: Aug. 26, 2015

(87) PCT Pub. No.: WO2014/131734
PCT Pub. Date: Sep. 4, 2014

(65) Prior Publication Data
US 2016/0006251 A1    Jan. 7, 2016

(30) Foreign Application Priority Data
Feb. 27, 2013 (EP) .................... 13156985

(51) Int. Cl.
H02J 1/10 (2006.01)
H02J 3/38 (2006.01)
(Continued)

(52) U.S. Cl.
CPC ............... H02J 3/383 (2013.01); H02J 3/28 (2013.01); H02J 3/40 (2013.01); H02J 7/34 (2013.01);
(Continued)

(58) Field of Classification Search
None
See application file for complete search history.

(56) References Cited

U.S. PATENT DOCUMENTS 9,595,888 B2 * 3/2017 Tao .................. H02M 7/538
2009/0179500 A1 * 7/2009 Ragonese ............ H02J 1/10
307/82

(Continued)

FOREIGN PATENT DOCUMENTS

EP        2 403 121 A2    1/2012
WO    WO 2013/030236 A2    3/2013

OTHER PUBLICATIONS

International Search Report (PCT/ISA/210) dated Mar. 19, 2014, by the European Patent Office as the International Searching Authority for International Application No. PCT/EP2014/053555.
(Continued)

Primary Examiner — Cassandra Cox
(74) Attorney, Agent, or Firm — Buchanan Ingersoll & Rooney P.C.

(57) ABSTRACT

A method of controlling a plurality of DC/AC converters in cascade configuration, each being arranged to receive an input direct current and voltage from a respective photovoltaic panel and to deliver an electric output. The method includes receiving information representing at least one of frequency, phase, amplitude and harmonics of a required AC, and receiving information on the input direct current and voltage to each one of the plurality of DC/AC converters. Based on the received information, each one of the plurality of DC/AC converters is individually controlled in such manner that the combined output from the plurality of DC/AC converters produces an AC matching the required AC.

15 Claims, 3 Drawing Sheets

(51) Int. Cl.
    *H02M 7/49*     (2007.01)
    *H02J 3/28*     (2006.01)
    *H02J 3/40*     (2006.01)
    *H02J 7/34*     (2006.01)
    *H02M 7/537*     (2006.01)

(52) U.S. Cl.
    CPC ............ *H02M 7/49* (2013.01); *H02M 7/537* (2013.01); *H02J 3/385* (2013.01); *H02J 7/345* (2013.01); *Y02E 10/563* (2013.01); *Y02E 10/566* (2013.01); *Y02E 10/58* (2013.01); *Y02E 70/30* (2013.01)

(56) References Cited

U.S. PATENT DOCUMENTS

| | | | |
|---|---|---|---|
| 2011/0316342 A1 | 12/2011 | El-Barbari et al. | |
| 2012/0177133 A1* | 7/2012 | Oldenkamp | H04B 3/54 375/257 |
| 2013/0234524 A1* | 9/2013 | Balda Belzunegui | H02M 7/493 307/82 |

OTHER PUBLICATIONS

International Preliminary Report on Patentability (PCT/IPEA/409) dated Jan. 29, 2015 for International Application No. PCT/EP2014/053555.
European Search Report dated Jun. 24, 2013 for Application No. EP 13 15 6985.
Faete Filho et al., "11-Level Cascaded H-Bridge Grid-Tied Inverter Interface with Solar Panels", Applied Power Electronics Conference and Exposition (APEC), 2010 Twenty-Fifth Annual IEEE, Feb. 21, 2010, pp. 968-972, XP-031649587.
O. Alonso et al., "Cascaded H-Bridge Multilevel Converter for Grid Connected Photovoltaic Generators with Independent Maximum Power Point Tracking of Each Solar Array", PESC'03. 2003 IEEE 34th, Annual Power Electronics Specialists Conference, Jun. 15-19, 2003, vol. 2, pp. 731-735, XP-010648900.

* cited by examiner

METHOD FOR DC-AC CONVERSION

TECHNICAL FIELD

The invention disclosed herein relates to DC/AC converters for photovoltaic panels. More precisely, it relates to a method of controlling DC/AC converters arranged to receive an input direct current and voltage from a photovoltaic panel and to deliver an output alternating current and voltage.

BACKGROUND

Photovoltaic (PV) elements, such as e.g. solar panels, are known to convert solar energy into direct current (DC). The solar energy can be fed into the electrical AC grid by means of a string inverter, wherein series connected panel are directly connected to the input of the string inverter. A DC/DC boost converter is used in the input stage of the string inverter to adapt the voltage to a desired level to the next DC/AC converter stage. The DC/AC converter stage converts the intermediate voltage into an alternating current (AC) which can be fed into existing electrical grids. Since the output power of a PV panel is determined by a non-linear relationship between voltage and current, a partial shadowing of a PV panel may cause a great reduction in its output and greatly increase its internal resistance. As the panels are connected in series, a power mismatch between PV panels may lead to a drastic and disproportionate loss of power from the entire solar array. Events like a passing shadow, or differences in panel performance due to pollution, differential aging, or differences during manufacturing, may hinder the array as a whole to operate at its peak efficiency point.

One attempt to address this issue is to connect a micro-inverter to each PV panel. Each micro-inverter tunes the output of their respective PV panel and directly outputs an AC that can be feed to the existing electrical grid. By connecting the micro-inverter outputs in parallel, the array of PV panels may be less sensitive to shadowing or failure of single PV panels. One drawback of this approach is however the relatively high cost of the micro-inverters. Another disadvantage is the large voltage conversion ratio which results in a relatively low efficiency.

A different attempt to address the same issue is to add DC/DC converters, so called power optimizers, to each PV panel. The outputs of these DC/DC converters are series connected and fed to a string inverter. This also allows tuning the output of the respective PV panels. The drawbacks are similar to the drawbacks of the micro-inverters, i.e. reduced efficiency and increased cost.

Thus, there is a need for providing an alternative method of feeding solar energy into the grid such that the overall conversion efficiency and performance, also at partial shading and mismatched panel powers, is improved.

SUMMARY

An object of at least some of the embodiments of the present invention is to wholly or partly overcome the above drawbacks and to provide an improved alternative to the above technique.

Generally, it is an object of at least some of the embodiments of the present invention to provide a method of controlling DC/AC converters in such manner that conversion efficiency and performance, also at partial shading and mismatched panel powers, is improved, and to enable a modular system having flexibility and up-time.

This and other objects of the present invention are achieved by means of a method having the features defined in the independent claim. Preferable embodiments of the invention are characterised by the dependent claims.

Hence, a method of controlling a plurality of DC/AC converters in cascade configuration is provided, wherein each one of the plurality of DC/AC converters are arranged to receive an input direct current and voltage from a respective photovoltaic panel and to deliver an output. The method comprises receiving information representing at least one of frequency, phase, amplitude and harmonics of a required AC, and receiving information on at least of input current and voltage to each one of the plurality of DC/AC converters. Based on the received information, each one of the plurality of DC/AC converters is individually controlled such that the combined output from the plurality of DC/AC converters produces an AC matching the required AC.

The present invention makes use of an understanding that adding conversion stages in the power path results in low efficiency and high cost. Furthermore, to maximize system energy output individual control of the PV panels is needed. This requires a separate converter for each PV panel. In the present invention only one conversion stage is used. Each PV panel converter directly converts the input power to a low-voltage AC. Each one of the DC/AC converters is individually operated in response to the input direct current and voltage of each one of the DC/AC converters and the required AC. The present invention is advantageous in that it provides the possibility of individually adapt the DC/AC converters to the actual performance of each one of the PV panels and the characteristics of e.g. an existing electrical AC grid. By only having one conversion stage, a high overall DC/AC conversion efficiency is enabled, and an AC having e.g., voltage, phase, frequency, and harmonics matching the required AC is provided.

Furthermore, the present invention allows for individual PV panel monitoring. Monitoring energy production of each panel may e.g. give an operator an early indication regarding need for panel cleaning and maintenance, resulting in better utilisation. Monitoring and controlling PV panels instead of each PV element (or cell) of the panels, advantageously allows for a modular converter system and at a lower cost. Additionally, by controlling the respective DC/AC converters based on the received PV panel input, the input direct current and voltage may be efficiently converted even if some of the PV elements are shadowed.

By using DC/AC converters capable of converting varying input direct current and voltage to the combined output, any boost converter, i.e. a DC-to-DC power converter increasing the voltage delivered by the PV panel to a desired level, may be eliminated, which may increase efficiency and reduce costs related to e.g. manufacturing and maintenance.

It should be realised that the plurality of DC/AC converters in cascade configuration may be referred to as a DC/AC inverter adapted to convert input direct current and voltage from a plurality, or array, of PV panels (comprising at least two PV elements or cells) into a combined output. Further, each one of the plurality of DC/AC converters may comprise an H-bridge converter having e.g. four metal oxide semiconductor field effect transistors (MOSFETs) or insulated gate bipolar transistors (IGBTs), and may be controlled by a control circuitry comprising e.g. a micro-controller.

According to an embodiment, the method further comprises charging an energy storage element electrically connected to at least one of the plurality of DC/AC converters. Advantageously, the energy storage element may be charged by output current from at least one of the plurality of DC/AC converters in the cascade configuration, the power grid, and/or the photovoltaic (PV) panel connected to the DC/AC converter.

According to an embodiment, direct current and voltage is input to the DC/AC converter from the energy storage element in response to the input current and voltage to a DC/AC converter received from the photovoltaic panel being below a threshold, and/or the combined output from the plurality of DC/AC converters being below a threshold. The method further comprises converting, at the DC/AC converter, the received input direct current and voltage to output such that the combined output from the plurality of DC/AC converters produces an AC matching the required AC.

Using an energy storage element, such as e.g. a capacitive storage element, for inputting direct current and voltage to the DC/AC converter may increase redundancy and fault tolerance of a PV plant. The present embodiment is advantageous in that it enables a DC/AC converter to be active in delivering an output even though the input from its related PV panel is reduced, e.g. due to shadowing. The energy storage element allows the DC/AC converters to participate in producing the combined output by means of reactive power flow which allows delivering the output also when the PV panel is out of order or even disconnected.

In case of the input direct current and voltage from the PV panel being below a threshold, which may be dynamically changed, or the PV panel being disconnected, the energy storage element advantageously may be charged by e.g. the output from at least one of the other DC/AC converters of in the cascade configuration, or by the power grid. This also enables a robust system that may continue to operate if a panel fails.

By connecting controlled DC/AC converters to each one of the PV panels, the respective output may be shut off. This ability facilitates panel cleaning and maintenance and makes it safer.

According to an embodiment, an energy storage is used to cover the mismatch between the power produced by the PV panels and the power supplied to the grid. The steps of charging and discharging the energy storage element are performed during a time shorter than 1 second, preferably during a period, i.e. cycle, of the required AC.

According to an embodiment, at least one dummy unit is connected to the plurality of DC/AC converters in cascade configuration. The dummy unit comprises an energy storage element and a DC/AC converter. According to this embodiment, the dummy unit is used for producing the combined output such that the combined output the plurality of DC/AC converter produces an AC matching the required AC. The term "dummy unit" should be understood as a unit comprising a DC/AC converter in cascade configuration and an energy storage element, which DC/AC converter is not directly connected to a PV element. The dummy unit may however be indirectly supplied with power from the PV elements in the system through the cascade connection. The use of a dummy unit enables a circuit comprising an arbitrary number of PV panels connected to DC/AC converters to be installed in the system. "Missing" panels may hence be compensated for by a respective dummy unit which enables circuits having a arbitrary number of PV panels, thereby improving the flexibility and modularity of the DC/AC converter. The present embodiment is also advantageous in that it provides a possibility to disconnect a PV panel from a respective DC/AC converter upon installation, or at a later stage, such as during operation. The PV panel may e.g. be disconnected due to shadowing, damage, low performance, or reconfiguration. Hence, the present embodiment enables a combined output from the plurality of DC/AC converters produces an AC matching the required AC even though one or several of the PV panels are out of order or missing.

According to an embodiment, each one of the plurality of DC/AC converters is individually controlled such that each one of the respective photovoltaic panels is operated in their respective optimum working points. The current-voltage (I-V) characteristic of a PV panel is non-linear. Along this I-V curve, an optimum working point, or maximum output power point, of the PV panel can be found for a certain current and a certain voltage level. Thus, the PV panel may deliver a maximum (or at least near-maximum) output power when a proper load is applied to the PV panel. This may e.g. be achieved by using Maximum Power Point Tracking (MPPT), wherein the optimum working point of each PV panel is determined by monitoring the respective power output at various output voltages, or by other techniques readily understood by a person skilled in the art. Thus, the present embodiment is advantageous in that it enables the PV panels to be operated with improved efficiency.

According to an embodiment, the information representing the input current and voltage to each one of the plurality of DC/AC converters is received repeatedly during operation. This provides the possibility to dynamically adjust the operation of the DC/AC converters during operation, preferably automatically, such that changes in the input power caused by e.g. shadowing of the PV panels may be compensated for. The information may be received on the basis of a time interval, which may be chosen to be so short that it is equivalent to receiving the information on a continuous basis.

According to embodiments of the present invention, the method may further comprise receiving information on at least one of the number of DC/AC converters in cascade configuration, the number of DC/AC converters currently connected to a photovoltaic panel, the number of DC/AC converters currently connected to a non-operating photovoltaic panel, and the number of dummy units currently connected in the cascade configuration.

This information may e.g. be received upon connection to an existing power grid, which enables the DC/AC converters to be efficiently controlled in accordance to the prevailing conditions (i.e., e.g. the required AC and the performance of the PV panels) and the configuration of the PV panel array and the plurality of DC/AC converters (i.e., the number of DC/AC converters, the number of dummy units, and the number of non-operating PV panels). It will also be appreciated that the information may be received during operation, for example on the basis of a time interval, which advantageously enables the DC/AC converters to be controlled in response to changes, such as e.g. failing PV panels.

According to an embodiment, each one of the plurality of DC/AC converters is arranged to be integrated with a respective PV panel, which advantageously may facilitate manufacturing and installation. Further, the need for DC cabling between the PV panels and the DC/AC converters may be eliminated. Thereby power loss between the PV panels and the DC/AC converter may be reduced, as well as the cost for DC cabling and connectors.

The invention may be embodied as computer-readable instructions for controlling a programmable computer in such manner that it performs the control method outlined above. Such instructions may be distributed in the form of a computer-program product comprising a computer-readable medium storing the instructions. In particular, the instructions may be loaded in a switch control circuitry or a micro-controller responsible for controlling the DC/AC converters.

Further objectives of, features of, and advantages with, the present invention will become apparent when studying the following detailed disclosure, the drawings and the appended claims. Those skilled in the art will realise that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, in which.

All the figures are schematic, not necessarily to scale, and generally only show steps and parts which are necessary in order to elucidate the invention, wherein other parts may be omitted or merely suggested.

DETAILED DESCRIPTION

Figure 1:
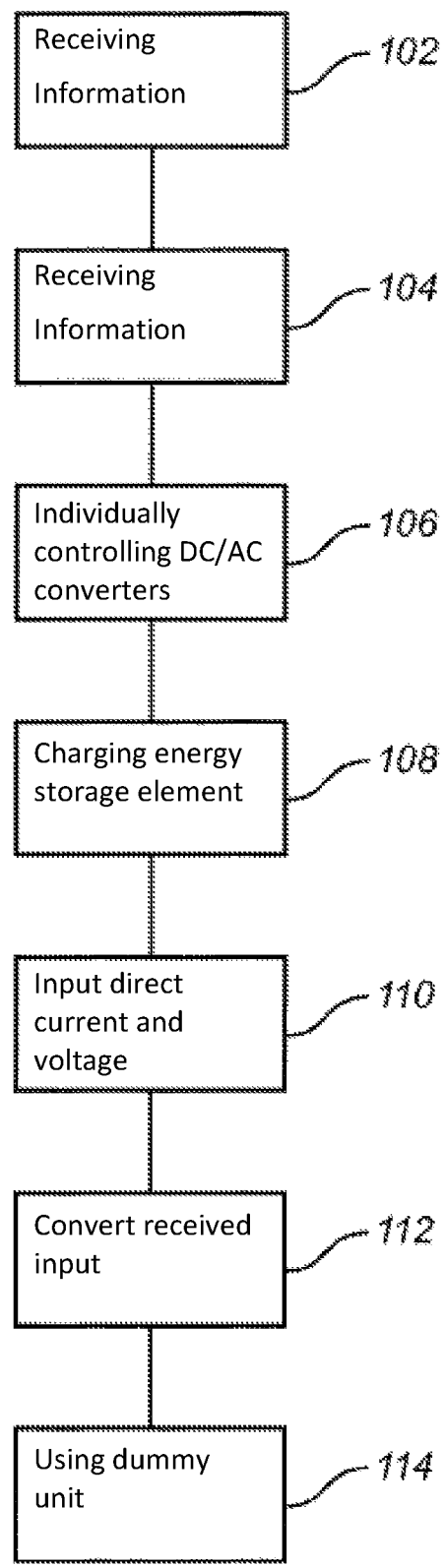
FIG. 1 illustrates the outline of a method for controlling a plurality of DC/AC converters in accordance with an embodiment of the present invention.

With reference to FIG. 1, there is shown a schematic outline of a method according to an embodiment of the present invention, wherein a plurality of DC/AC converters in cascade configuration is controlled. Each one of the plurality of DC/AC converters are arranged to receive an input direct current and voltage from a respective PV panel and to deliver an electric output.

The method comprises receiving 102 information on a required AC, wherein the information may represent at least one of frequency, phase, amplitude, and harmonics. The required AC may e.g. correspond to an existing AC power grid into which the output AC from the DC/AC converters is fed, and be delivered by a current meter, arranged at a measuring point of the AC power grid, to a micro-controller arranged to control the DC/AC converters. The information may e.g. be received repeatedly during operation so as to enable monitoring of the required AC.

The method further comprises receiving 104 information on the input direct current and voltage to each one of the plurality of DC/AC converters, representing e.g. current and voltage. The information may, e.g., be collected by a current meter arranged at an output terminal of each one of the PV panels and delivered to the micro-controller. In one example, the information is received on the basis of a time interval which is chosen to be so short that it is equivalent to receiving the information on a continuous basis. Thereby a continuous monitoring of the performance of individual PV panels is enabled.

In the next step, each one of the plurality of DC/AC converters is individually controlled 106 to deliver a combined output that produces an AC matching the required AC. The controlling is based on the received information about the required AC and the input supplied to each one of the DC/AC converters by e.g. a respective PV panel. Each one of the plurality of DC/AC converters may be controlled, e.g. by Maximum Power Point Tracking (MPPT) such that they are operated in their respective optimum working points.

The method may also comprise a step of charging 108 an energy storage element, such as e.g. a capacitor, that is electrically connected to at least one of the plurality of DC/AC converters. The energy storage element may be charged using output from another one of the plurality of DC/AC converters, the power grid, the AC power grid, or from the PV panel connected to the DC/AC converter.

Furthermore, the energy storage element may input 110 direct current and voltage to the DC/AC converter. This may e.g. be performed in response to the input generated by the PV panel being below a threshold, for example indicating that the input direct current and/or voltage is too low to be converted to alternating current and voltage that can be combined to produce an AC matching the required AC. The energy storage element may also input direct current and voltage to the DC/AC converter if the combined output from the plurality of DC/AC converters is below a dynamically determined value.

In the next step, the DC/AC converter converts 112 the received input direct current and voltage from the energy storage element such that the combined output produces an AC matching the required AC.

The steps of charging the energy storage element and inputting direct current and voltage to the DC/AC converter may be performed during a time interval shorter than 1 second.

The method may also comprise a step of using 114 a dummy unit for producing a combined output producing an AC matching the required AC. The dummy may e.g. comprise a DC/AC converter which is connected to an energy storage element, being supplied with an input power from an energy storage element as described with reference to the above step of charging 108 an energy storage element, but not electrically connected to a PV panel.

Figure 2:
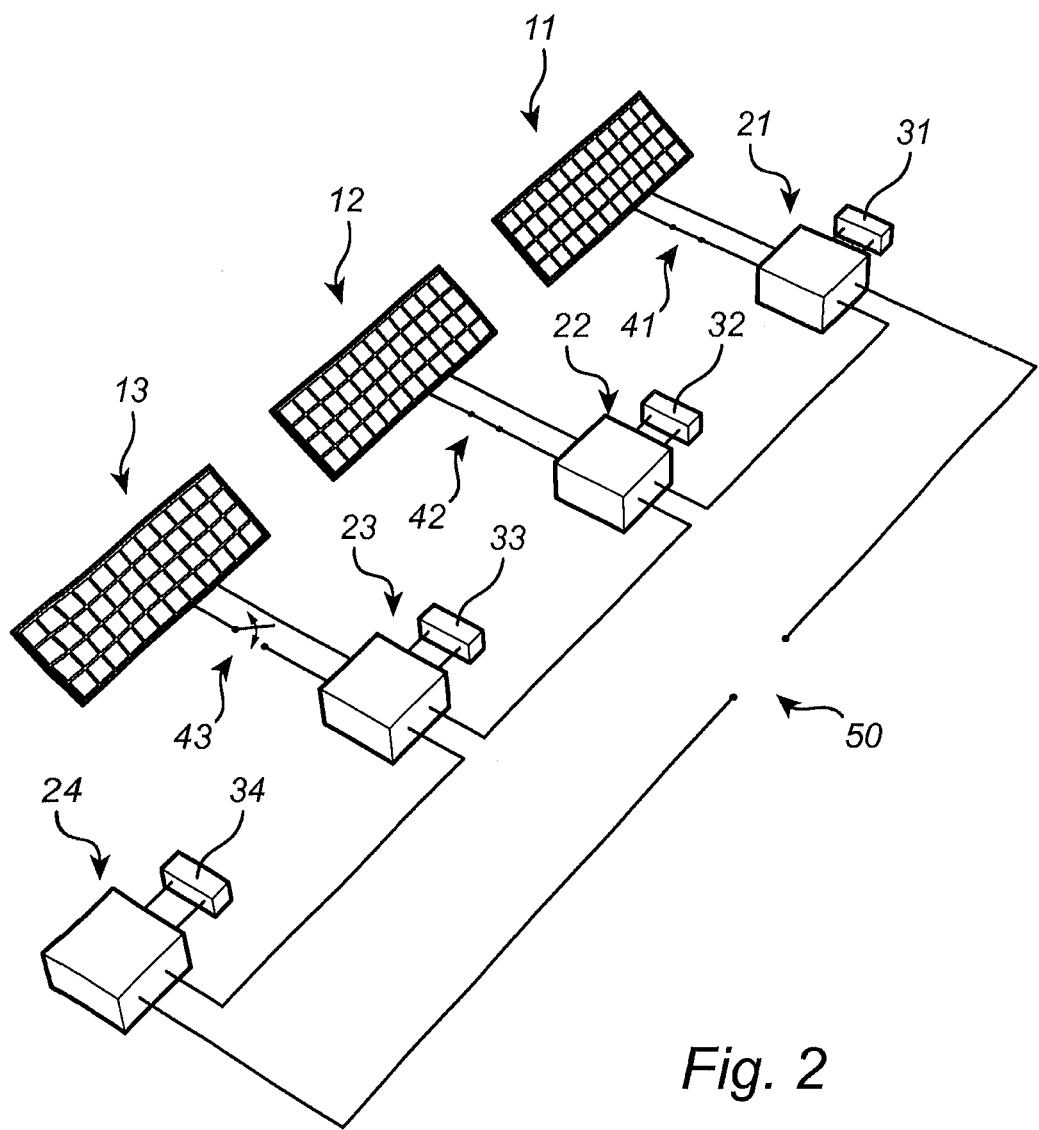
FIG. 2 schematically shows a plurality of DC/AC converters and a PV panel.

With reference to FIG. 2, there is schematically shown four DC/AC converters 21, 22, 23, 24 connected to an array of three PV panels 11, 12, 13. The DC/AC converters 21, 22, 23, 24 are arranged to receive a respective input direct current and voltage, and to deliver a respective output. An AC, matching the required AC, is produced by the combined output and fed into an AC power grid via an AC terminal 50. Each one of the DC/AC converters 21, 22, 23, 24 is electrically connected to an energy storage 31, 32, 33, 34 adapted to be charged by output from e.g. another DC/AC converter or by the AC power grid. The energy storage element 31, 32, 33, 34 may be active in the conversion, e.g. by supplying the DC/AC converter 21, 22, 23, 24 with input direct current and voltage.

According to the embodiment of FIG. 2, three of the DC/AC converters 21, 22, 23 are electrically connected to a respective PV panel 11, 12, 13 which is adapted to deliver input direct current and voltage during operation. Further, a switch 41, 42, 43, 44 may be provided at the input of the DC/AC converter 21, 22, 23, 24 so as to enable the PV panel 11, 12, 13, 14 to be disconnected from the DC/AC converter 21, 22, 23, 24, e.g. in response to the PV panel 11, 12, 13, 14 delivering reduced power due to shadowing. The fourth DC/AC panel 24, which is not associated with a PV panel, is a dummy unit 24 converting input current and voltage from an energy storage element 34 in accordance with the operation of the other three DC/AC converters 21, 22, 23. It is appreciated that the present DC/AC converters 21, 22, 23 may be used both with PV panels and without. Arrays comprising an arbitrary number of panels can be realized through combining units like 21, 22, 23 and units like 24. Furthermore, it is appreciated that any one of the DC/AC converters 21, 22, 23, 24 may be disconnected at any time, e.g. due to a non-operating or damaged PV panel 11, 12, 13, thus turning the functionality of the DC/AC converter into that of a dummy unit 24.

Figure 3:
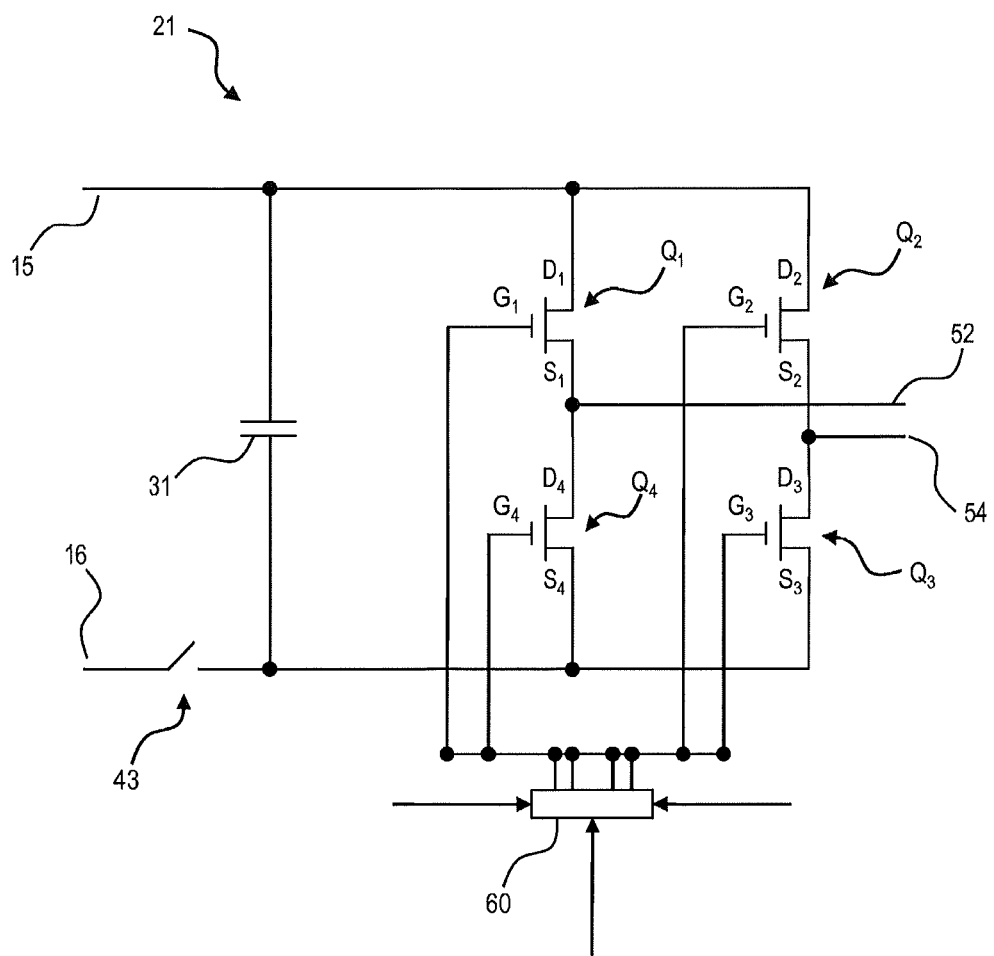
FIG. 3 shows a DC/AC converter in accordance with a embodiment of the present invention.

Finally, FIG. 3 shows an exemplifying embodiment of a DC/AC converter 21, more specifically a circuit diagram of an H-bridge converter 21, comprising four switching elements $Q_1$, $Q_2$, $Q_3$, $Q_4$ in the form of four metal oxide semiconductor field effect transistors (MOSFETs) $Q_1$, $Q_2$, $Q_3$, $Q_4$. However, any other appropriate switching element may be used, such as insulated gate bipolar transistors (IGBTs), or bipolar junction transistors (BJTs).

The drain $D_1$ of the first transistor $Q_1$ and the drain $D_2$ of the second transistor $Q_2$ are electrically connected to a positive pole 15 of the input from the PV panel (not shown), while the sources $S_1$ and $S_2$ of the respective first and second transistors $Q_1$ and $Q_2$ are electrically connected to the drains $D_4$ and $D_3$ of the fourth and third transistors $Q_4$, $Q_3$, respectively. The sources $S_3$, $S_4$ of the third and fourth transistors $Q_3$, $Q_4$ are electrically connected to a negative pole 16 of the input from the PV panel. The source $S_1$ of the first transistor $Q_1$ is electrically connected to the drain $D_4$ of the fourth transistor $Q_4$ at a first output terminal 52, whereas the source $S_2$ of the second transistor $Q_2$ is electrically connected to the drain $D_3$ of the third transistor $Q_3$ at a second output terminal 54.

The gate terminals $G_1$, $G_2$, $G_3$, $G_4$ of the four transistors $Q_1$, $Q_2$, $Q_3$, $Q_4$ are electrically connected to a switch control circuitry 60 adapted to control the MOSFETs $Q_1$, $Q_2$, $Q_3$, $Q_4$ by supplying a gate voltage to their respective gates $G_1$, $G_2$, $G_3$, $G_4$. The switch control circuitry may comprise a micro-controller 60, e.g. mounted on a printed circuit board (not shown) along with the H-bridge converter 21. The micro-controller 60 may also be connected to current and/or voltage meters (not shown) providing the micro-controller with information on the input direct current and/or voltage from the PV panel, the output at the first and second AC terminals, and the required AC (the input represented by arrows).

The micro-controller 60 may be used for controlling the DC/AC converter 21 in such manner that the combined output from the plurality of the DC/AC converters 21, 22, 23, 24 produces an AC matching the required AC. This may be achieved by means of pulse-width modulation (PWM) techniques adapted to consider the required AC, the voltage, current, and frequency of the output from each one of the DC/AC converters 21, 22, 23, 24, and possible input voltage and current from their respective PV panels 11, 12, 13.

Furthermore, the micro-controller 60 may also be adapted to operate a switch 43 arranged at the input of the H-bridge converter 21. The switch 43 is adapted to disconnect the H-bridge converter 21 from the PV panel, and may e.g. be realised by a fifth MOSFET.

The micro-controller 60 may comprise a signal and/or data processing module for processing received data, such as the information received from the current meters, and/or for further processing of refined data, as well as a central processing unit (CPU). Further, the micro-controller 60 may comprise a memory or storage unit for storing the received information and/or for storing other data, such as data further processed by the micro-controller. The micro-controller may also comprise suitable peripheral I/O capability executing software e.g. for analyzing input information. Other types of hardware, e.g. a personal computer, may also be used.

A capacitor 31 is connected in parallel with the H-bridge converter 21 and is adapted to filter input power to or act as a storage element for the H-bridge converter 21 during operation, e.g. as the H-bridge 21 is disconnected from the PV panel 11 by the switch 43. The capacitor 31 may be charged by power from another of the DC/AC converters 22, 23, 24, by the PV panels 12, 13, or e.g. by the power grid.

As outlined above, the method illustrated by FIG. 1 may be embodied as computer-executable instructions distributed and used in the form of a computer-program product including a computer readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media typically embodies computer readable instructions, data structures, program modules or other data in a modulated data signal such as a carrier wave or other transport mechanism and includes any information delivery media. While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A method of controlling a plurality of DC/AC converters in cascade configuration, each one of the plurality of DC/AC converters being arranged to receive an input direct current and voltage from a respective photovoltaic (PV) panel, and to deliver an output, the method comprising:
   receiving information representing at least one of frequency, phase, amplitude and harmonics of a required AC;
   receiving information representing at least one of current and voltage of the input direct current and voltage to each one of the plurality of DC/AC converters; and
   based on the received information, individually controlling each one of the plurality of DC/AC converters such that the combined output of the plurality of DC/AC converters produces an AC matching the required AC, wherein one or more dummy unit is further connected to the plurality of DC/AC converters in cascade configuration, said one or more dummy unit comprising an energy storage element adapted to be charged and to output direct current and voltage, and a DC/AC converter, wherein the method further comprises:

using the one or more dummy unit for producing an output such that the combined output from the plurality of DC/AC converters produces an AC matching the required AC.

2. The method according to claim 1, further comprising: charging an energy storage element electrically connected to at least one of the plurality of DC/AC converters.

3. The method according to claim 2, wherein charging the energy storage element comprises charging the energy storage element using output current from at least one of:
- at least one of the plurality of DC/AC converters in the cascade configuration,
- the power grid, and
- the photovoltaic panel connected to the DC/AC converter.

4. The method according to claim 2, further comprising: in response to at least one of:
- at least one of current and voltage of the input direct current and voltage to a DC/AC converter received from the photovoltaic panel, and
- the combined output from the plurality of DC/AC converters, being below a respective threshold,
inputting direct current and voltage to the DC/AC converter from the energy storage element, and
converting, at the DC/AC converter, the received input direct current and voltage to output such that the combined output of the plurality of DC/AC converters produces an AC matching the required AC.

5. The method according to claim 2, wherein the steps of charging the energy storage element and inputting direct current and voltage to the DC/AC converter from the energy storage element are performed during a time shorter than 1 second.

6. The method according to claim 1, wherein at least one of the plurality of DC/AC converters comprises a switch placed between the at least one DC/AC converter and a photovoltaic panel, and wherein the method further comprises the step of altering the switch to disconnect the at least one DC/AC converter from the photovoltaic panel.

7. The method according to claim 1, wherein each one of the plurality of DC/AC converters is individually controlled such that each one of the respective photovoltaic panels is operated in their respective optimum working points.

8. The method according to claim 1, wherein the information representing at least one of current and voltage of the input direct current and voltage to each one of the plurality of DC/AC converters is received repeatedly during operation.

9. The method according to claim 1, further comprising receiving information on the number of DC/AC converters in cascade configuration.

10. The method according to claim 1, further comprising receiving information on at least one of:
- the number of DC/AC converters currently connected to a photovoltaic panel,
- the number of DC/AC converters currently connected to a non-operating photovoltaic panel, and
- the number of dummy units currently connected in the cascade configuration.

11. The method according to claim 1, wherein each one of the plurality of DC/AC converters is arranged to be integrated with a respective PV panel.

12. The method according to claim 1, wherein each one of the plurality of DC/AC converters is controlled by a microcontroller.

13. The method according to claim 1, wherein each one of the plurality of DC/AC converters is an H-bridge converter.

14. The method according to claim 1, wherein the energy storage element is a capacitor.

15. The method according to claim 1, wherein the required AC is a grid AC.

* * * * *